April 24, 1962   A. G. FIRESTINE ETAL   3,030,746
METHOD OF GRINDING AND POLISHING OPTICAL GLASS
Filed Oct. 15, 1959
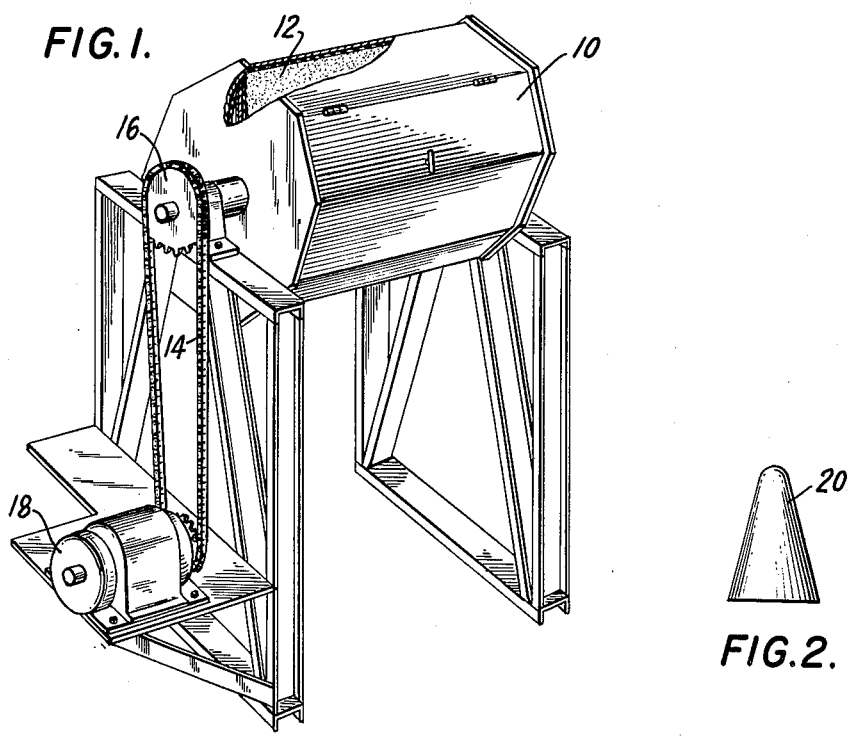
FIG.1.
FIG.2.
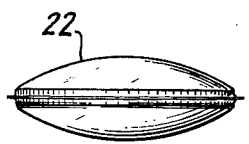
FIG.3.
INVENTORS.
ARTHUR G. FIRESTINE,
CHARLES F. MOONEY &
BY THEODORE J. ZAK
ATTORNEYS.

ated Apr. 24, 1962

3,030,746
METHOD OF GRINDING AND POLISHING OPTICAL GLASS
Arthur G. Firestine, Perinton, and Charles F. Mooney and Theodore J. Zak, Irondequoit, N.Y., assignors to Bausch & Lomb Incorporated, a corporation of New York
Filed Oct. 15, 1959, Ser. No. 846,669
7 Claims. (Cl. 51—284)

On one known method for the manufacture of optical glass such as that used in lenses, prisms, mirrors and the like, pieces of glass are heated to high temperature and pressed in a mold to the approximate desired shape. The resulting molded piece contains particles of dirt fused into the surface and the piece has a sharp edge or flashing positioned at the line of mold separation. The sharp edge of the flashing is undesirable because it is the locus of conchoidal fractures which occur even when small forces are applied to the edge during handling and as frequently happens the fracture will extend into the useful volume of optical glass so that the piece must be discarded. Radiusing the sharp edges and grinding the surfaces to remove dirt is an expensive and time consuming operation requiring considerable man hours and high tool costs.

Surprising enough we have now discovered that it is possible to radius sharp edges and to abrade away the glass surface and imbedded dirt by tumbling the glass pieces in a barrel. Contrary to expectation, we were able to control the tumbling operation so that a very insignificant number of pieces of molded glass lenses were chipped or broken and blind surface fractures to a depth not removable in the normal grinding operations preparatory to polishing were negligible.

Certain conditions must be fulfilled in order to tumble glass without damage. The first condition is that the abrasive composition in the barrel must be such as to prevent the lenses from being pushed to the surface. If the lenses accumulate at the surface they will slide without sufficient restraint and hammer against one another which only results in damage to the lenses. The second condition is that the abrasive composition must be such as to prevent the lenses from settling in strata in the bottom of the barrel. If this occurs the pieces either knock against each other or tumble over each other which tends to result in a chipped and fractured surface. Optimum results are achieved by adjusting the abrasive composition so that the optical glass pieces tend to be suspended in the slurry without any appreciable tendency to sink or float to the surface and when in motion there should be no tendency for the pieces to be pushed above the surface of the abrasive composition.

In the preferred embodiment of the invention th abrasive composition includes three ingredients. Namely, a liquid, an abrasive and small pellets of material called media. The types and amounts of these ingredients may be varied but the composition as a practical matter must satisfy the following conditions:

(1) The rate of descent of the workpiece in the abrasive composition must not exceed one foot in ten seconds in a freshly agitated composition held in a stationary barrel.

(2) A workpiece placed on the surface of freshly agitated but stationary abrasive composition immediately after stopping rotation of the barrel should at least sink down into the composition under its own weight to the extent that the top surface of the piece is approximately level with the surface of the abrasive composition and as brought out herein above optimum results are achieved by an abrasive composition in which the optical glass work pieces tend to be suspended in the abrasive composition without any appreciable tendency to sink or float to the surface, i.e. the density of the abrasive composition should be equal to or less than the density of the optical glass work piece.

Examples of liquids that may be employed include water, glycerine, kerosene, light mineral oil and other organic liquids either alone or in combination with water and each other. Viscosity of the liquid may be adjusted with thickeners such as the colloidal clays, vegetable and synthetic gums and the like commercially available thickeners. Control of the rate of descent of the workpiece in the abrasive composition within the range specified herein above is most conveniently carried out by adjusting the viscosity of the liquid. Best results are achieved by adjusting the viscosity of the liquid after the abrasive and media have been added.

The abrasive employed in the composition may be any one of those customarily used for grinding glass such as garnet, corundum, boron carbide, quartz, aluminum oxide, emery, and silicon carbide. Initially the average size of the abrasive particles is in general between 20 and 100 microns. The size of the particles will of course steadily decrease with use and as the size of the particles decrease the time required for tumbling will increase. When the time for tumbling exceeds practical limits for commercial operation the abrasive is renewed by adding fresh particles or by making up a fresh composition. The amount of abrasive employed in the slurry may be varied and in general as the amount of the abrasive is increased the time of tumbling will decrease and as the amount of abrasive is decreased the time of tumbling will increase. Best results are achieved when enough abrasive is used to cover exposed surfaces of the workpieces and media with a suspended coating of abrasive.

Examples of some of the media that may be employed include ceramic cones, plastic slugs, plastic molding powder, limestone, synthetic aluminum oxide chips, maple shoe pegs, soft steel diagonals, felt, leather, corn cobs, cork, and waxes. The size of the individual pieces of media should be less than the size of the workpiece in any one given dimension. The amount of media in the abrasive composition may be varied but as a practical matter we have achieved excellent results by weighing the minimum quantity of pieces of media required to envelop a single workpiece. The weight of media necessary to do this is then divided into the total weight of media of the abrasive composition to be used in the barrel in order to determine the number of workpieces which may be tumbled in a given abrasive composition. After this is determined the viscosity of the final abrasive composition is adjusted as described herein above to provide the specified conditions concerning descent of the workpiece in the composition. As the size of the workpiece increases the number of pieces that may be tumbled in a given barrel will decrease and depending upon the size of the tumbling barrel it may be necessary to tumble one workpiece at a time.

The tumbling barrel employed in the process is conventional and it may be made of wood, plastic or metal. The barrel is preferably lined with a resilient cushioning material such as rubber. In our work we have employed a conventional horizontal metal tumbling barrel lined with rubber. The barrel was about thirty inches long and it had two adjacent compartments of equal capacity. Each compartment had a capacity of about 6.9 cubic feet. The barrel was rotated in conventional manner and the speed of rotation was satisfactory between about 5 to 10 r.p.m. Best results are achieved when the surface of the wall of the barrel is such that it does not make surface to surface contact with a surface of the workpiece and the surface of the wall of the barrel should not contact the entire rim of a surface of the workpieces. If this occurs individual pieces of glass will tend to stick to the wall of the barrel where they become damaged and damage other pieces.

These and other advantages and the details of the present invention may be readily appreciated by reference to the accompanying drawings in which:

FIG. 1 illustrates a conventional tumbling barrel employed in the present process.

FIG. 2 illustrates one type of media that may be employed in the abrasive composition.

FIG. 3 illustrates a workpiece in the form of an optical lens.

Referring to the drawings, 10 is a wood octagonal tumbling barrel which is thirty inches in diameter and thirty-two inches long. The interior of the barrel is divided in half by partition 12 and it is lined with a one-quarter inch layer of neoprene rubber. The barrel is rotated by means of a chain 14 and sprocket 16 and these are in turn driven by a one and one-quarter horsepower motor 18 having a variable speed of from six to thirty r.p.m.

*Example I*

In this example three hundred pounds of media were loaded into one of the compartments of the rubber lined barrel. Two-thirds by weigh of the media consisted of ceramic cones made of fused aluminum oxide and the other one-third were nylon. As shown in FIG. 2 of the drawings the ceramic cones 20 were about 0.5 inch high and the diameter at the base was about 0.31 inch and at the top about .06 inch. The nylon was in the form of small bicones of about the same general size as the ceramic cones. Five hundred condenser lenses 22 (FIG. 3) of the type used for illuminating transparencies were placed in the media in spaced relationship. This was done by pushing about one-half of the lenses down just below the top surface layer of media in spaced relationship and then the barrel was rotated one revolution and the remaining lenses were pushed down just below the top surface layer of the media in spaced relationship. Thirty-five pounds of Number 500 emery slurried in seven gallons of water was then added to the media. The consistency of the abrasive slurry of this composition was such that the rate of descent of the workpiece was less than one foot in ten seconds, in a freshly agitated slurry held in stationary position in a test barrel and when the piece was placed on the surface it sank down until it became suspended with the top surface approximately level with the surface of the liquid. Thereafter the piece showed no appreciable tendency to sink into the abrasive slurry.

When fully charged the compartment of the barrel was filled to about sixty percent of its total capacity. The barrel was then sealed and allowed to rotate for twenty-four hours at a speed of about five and one-half revolutions per minute.

At the end of this time the barrel was stopped and sample lenses taken from the barrel had been satisfactorily rough ground. The extremely rough surface of the molded lens had been replaced by a fairly smooth translucent ground surface. Most of the fused dirt had been removed from the surface of the lens and the sharp edge of the flashing had been rounded eliminating the damage of fracture at this point. The profilometer reading of the lenses was 40 to 50 microinches.

Thereafter the lenses and media were thoroughly rinsed to remove the Number 500 emery. This was done by filling the compartment with water and then a screen door was placed over the opening and the barrel was rotated about four times and stopped with the screen door down to allow the water to drain out. The rinsing procedure was repeated three times.

Thereafter thirty-five pounds of equal amounts of Number 1100 and Number 1200 emery were mixed in seven gallons of water and the resulting mixture was then added to the compartment. The compartment was then sealed and the barrel rotated at five and one-half r.p.m. for a period of twenty-four hours. At the end of this time the compartment of the barrel was again rinsed as described above. The profilometer reading at this time was 18 to 20 microinches.

This completed the rough grinding operation; the fused dirt had been removed from the surface of the lens and the sharp edge of the flashing had been rounded into a smooth curve and the danger of fracture at this edge had been eliminated.

In the course of our work we further investigated the possibility of achieving a polish on the lens after the rough grinding operation and we quite unexpectedly found that we were able to achieve a polish on the surface of the lens which was substantially equal to that obtained in conventional manner and in some respects the polish was even better than that obtained in conventional manner.

It now appears from our early work that glass surfaces polished by tumbling may be harder and have greater resistance to chemical reagents and scratching than optical glass processed in conventional manner. While we do not now understand the exact reason why the surface of tumbled polished glass should be harder and more resistant to scratching and chemical reagents we believe that these beneficial results may be caused by three different factors.

First of all tumbling eliminates conventional diamond surfacing and edging which normally result in microscopic fractures that penetrate into the glass to reduce tensile strength and provide weak fissures or rough spots which are susceptible to chemical attack and into which abrasives may bite and scratch the polished glass surface.

Secondly in the tumbling operation we apparently achieve a microscopic smoothing of edges and corners to an extent which is not realized with conventional methods and this smoothing of edges and corners tends to increase all radii of surface curvature so that applied forces tend to be distributed over a larger surface area with less chance of fracture.

Finally it may well be that forces generated during the tumbling operation compact the surface layer of polished glass to give it greater hardness and strength. But regardless of the exact mechanism and extent of beneficial results that may later be proved for our tumbling process the fact remains that we have achieved such control of the tumbling operation that only an insignificant number of glass lenses are chipped or broken. Processing the lenses to achieve a polish was carried out as follows:

*Example 2*

Three hundred pounds of nylon bicones of the type used for rough grinding were added to one compartment of the barrel that was used for rough grinding. Seventy pounds of Glassite which is finely divided crystalline quartz was then mixed with five gallons of water and the mixture added to the nylon media. The lenses produced in Example 1 were placed in the compartment of the barrel with the all nylon media in the manner described in Example 1. The consistency of the abrasive slurry of this composition was such that the rate of descent of the workpiece was less than one foot in ten seconds in a freshly agitated slurry held in stationary position in a test barrel and when the piece was placed on the surface it sank down until it became suspended with the top surface approximately level with the surface of the liquid.

The barrel was then sealed and rotated at five and one-half r.p.m. for twenty-four hours. At the end of this time the lenses were removed from the barrel and rinsed. Upon examination the lenses had started to take on a polish and the profilometer reading was between 5 to 8 microinches.

Final polishing of the lenses was carried out in a barrel indentical with that used in Example 1 and the compartment of the barrel was loaded with 144 pounds of cellulose acetate extruding powder which served as the media along with seventy pounds of Glassite and eight gallons of water. The lenses were then placed in the abrasive slurry in the same manner as described above. The viscosity of this abrasive slurry was approximately the same as that employed in the first polishing step of this Example 2. The barrel was rotated at a speed of five r.p.m. for twenty-four hours and at the end of this time the lenses were removed from the barrel and rinsed. The surface of the lenses had an exceptionally fine polish which was found to be better than that which had been achieved by conventional polishing of lenses which had the same glass composition.

At the end of the processing only a very insignificant number of lenses were damaged to the extent that they could not be used commercially. Examination of the surface of the tumbled polished lenses showed no significant change in the profile shape of the lens and the blending of the wavy or deformed surface areas was satisfactory for illumination lenses.

While in the example we have used only one of the two compartments in the barrel it will be understood that both compartments of the barrel may be used simultaneously for processing two batches of glass. It will also be understood that the entire operation may be carried out in a single barrel and it is not necessary to change from one barrel to the other. In such cases care must be taken to rinse away the abrasive used in each operation in order to obtain the desired high polish on the surface of the glass lens. It is also possible to carry out the grinding and polishing with a single type of media and abrasive but the time required for grinding will in such case be increased. While we have described our invention in connection with a particular type of lens it will be understood that the process of our invention has broad application to the grinding and polishing of optical glass of any desirable configuration and the surfaces of the lens to be treated may be spherical or aspherical.

In testing the chemical resistance of optical glass which had been tumbled polished we found that the glass had greater resistance to chemical staining than glass polished in conventional manner.

In this test two sample lenses of crown glass were tumbled to a polished condition as described in the example set forth above. Thereafter one side of each lens was reworked by milling grinding and conventional polishing. The lenses were then submerged in acid for two days. At the end of this time the lenses were removed from the acid and examined and it was found that the side ground and polished in conventional manner had a layer from which the soluble glass constituents had been leached which was thicker than the one of the tumbled processed lens. The tumble polished glass had greater resistance to acid and because of this greater resistance to wear and chemical stains than glass polished in conventional manner.

If desired the abrasive may be omitted from the slurry and tumbling may be carried out by means of the abrasiveness of the media alone or the media may be impregnated with abrasive particles. If no abrasive is used the time required for processing the glass will be increased.

In describing the preferred form of invention we have employed a tumbling barrel as one convenient way of causing relative movement between the optical glass workpiece and abrasive slurry but it will be understood that movement of the workpiece relative to the slurry may be achieved in other ways as for example by placing the slurry and workpieces in a pan adapted to be vibrated or for example rotated in circles in a horizontal plane.

It will be understood that it is intended to cover all changes and modifications of the preferred form of invention herein chosen for the purpose of illustration which do not depart from the spirit and scope of the invention.

What is claimed is:

1. The method of abrading the surface of an optical glass work piece in a tumbling barrel which comprises the steps of forming an abrasive slurry in the barrel which includes a liquid, an abrasive for the glass and a plurality of pieces of media, placing a plurality of optical glass work pieces in spaced relationship in the slurry, adjusting the composition of the slurry to provide a consistency in which the rate of descent of a work piece is less than one foot in ten seconds in a freshly agitated slurry held in stationary position and in which freshly agitated slurry the work piece will of its own weight at least sink down until the top surface of the work piece is approximately level with the surface of the slurry, and then rotating the barrel to cause relative movement between the abrasive slurry and optical glass work piece.

2. The method of abrading an optical glass work piece in a tumbling barrel which comprises the steps of forming an abrasive slurry in the barrel which includes a liquid, an abrasive for the glass and a plurality of pieces of media comprising a mixture of ceramic cones and nylon slugs, placing a plurality of optical glass work pieces in spaced relationship in the slurry, adjusting the composition of the slurry to provide a consistency in which the rate of descent of a work piece is less than one foot in ten seconds in a freshly agitated slurry held in stationary position and in which freshly agitated slurry the work piece will of its own weight at least sink down until the top surface of the work piece is approximately level with the surface of the slurry, and then rotating the barrel to cause relative movement between the abrasive slurry and optical work piece.

3. The method of abrading an optical glass work piece in a tumbling barrel which comprises the steps of forming an abrasive slurry in the barrel which includes a liquid, finely divided crystalline quartz and finely divided cellulose acetate, placing a plurality of optical glass work pieces in spaced relationship in the slurry, adjusting the composition of the slurry to provide a consistency in which the rate of descent of a work piece is less than one foot in ten seconds in a freshly agitated slurry held in stationary position and in which freshly agitated slurry the work piece will of its own weight at least sink down until the top surface of the work piece is approximately at the same level as the liquid of the slurry, and then rotating the barrel to cause relative movement between the abrasive slurry and optical glass work piece.

4. The method of treating an optical glass work piece which comprises the steps of placing a plurality of optical glass work pieces in spaced relationship in an abrasive slurry having a consistency in which the rate of descent of a work piece is less than one foot in ten seconds in a freshly agitated slurry held in stationary position and in which freshly agitated slurry the work piece will of its own weight at least sink down until the surface thereof is approximately level with the surface of the slurry, and then causing relative movement between the work pieces and abrasive slurry.

5. The method of abrading an optical glass work piece which comprises the steps of placing a plurality of optical glass work pieces in spaced relationship in an abrasive slurry having a consistency in which the rate of descent of a work piece is less than one foot in ten seconds in a freshly agitated slurry held in stationary position and in which freshly agitated slurry the work piece will of its own weight at least sink down until the surface thereof is approximately level with the surface of the slurry, and which slurry includes a liquid and a plurality of pieces of media and then causing relative movement between the work pieces and abrasive slurry.

6. The method of abrading optical glass which comprises the steps of forming an abrasive slurry which includes as an essential ingredient thereof a plurality of pieces of media and which slurry has a consistency in which the rate of descent of a work piece is less than one foot in ten seconds in a freshly agitated slurry held in stationary position and in which freshly agitated slurry the work piece will of its own weight at least sink down until the surface of the work piece is approximately level with the surface of the slurry, placing a plurality of pieces of optical glass in spaced relationship in the slurry and then causing relative movement between the slurry and pieces of glass.

7. The method of abrading an optical glass work piece which comprises the steps of forming an abrasive composition having a consistency in which the rate of decent of a work piece is less than one foot in ten seconds in a freshly agitated slurry held in stationary position and having a density no greater than the density of a glass work piece, placing a plurality of pieces of optical glass in spaced relationship in the composition and then causing relative movement between the composition and pieces of glass.

References Cited in the file of this patent

UNITED STATES PATENTS

| | | |
|---|---|---|
| 1,528,543 | Hartmann | Mar. 3, 1925 |
| 1,887,026 | Lach | Nov. 8, 1932 |
| 2,062,671 | Lupo | Dec. 1, 1936 |
| 2,185,262 | Lupo | Jan. 2, 1940 |
| 2,359,323 | Lupo | Oct. 3, 1944 |
| 2,378,399 | Fruth | June 19, 1945 |
| 2,387,135 | Fruth | Oct. 16, 1945 |
| 2,431,870 | Huenerfauth et al. | Dec. 2, 1947 |
| 2,799,789 | Wolfskill | July 16, 1957 |

FOREIGN PATENTS

| | | |
|---|---|---|
| 29,418 | Great Britain | Dec. 20, 1912 |